United States Patent [19]

Sakurai et al.

[11] Patent Number: 4,692,820

[45] Date of Patent: Sep. 8, 1987

[54] HEAD-POSITIONING MECHANISM FOR AN ENDLESS TAPE

[76] Inventors: Koichi Sakurai, 316-77, Oaza Kozenji, Oora-machi, Oora-gun, Gunma; Minoru Kojima, 22-7, Misono-machi, Tatebayashi-shi, Gunma, both of Japan

[21] Appl. No.: 881,621

[22] Filed: Jul. 3, 1986

[30] Foreign Application Priority Data

May 19, 1986 [JP] Japan .................................. 61-114365

[51] Int. Cl.[4] ....................... G11B 15/06; G11B 23/32
[52] U.S. Cl. .................................................. 360/74.7
[58] Field of Search ....................................... 360/74.7

[56] References Cited

U.S. PATENT DOCUMENTS

| 3,731,008 | 5/1973 | Meri | 360/74.7 |
| 4,005,484 | 1/1977 | Fujita | 360/74.7 |
| 4,390,917 | 6/1983 | Watanabe | 360/74.7 |

*Primary Examiner*—George G. Stellar

[57] ABSTRACT

A head-positioning mechanism of an endless tape useful in, for example, various tape-recorders of an endless cartridge type is disclosed, in which the endless tape on its inner side between a capstan and a tape guide is provided with an electrically conductive sensor and at its predetermined site is provided with a cut-line, while the endless tape on its inner surface is normally supplied with a faint current for disenergizing a power source of a DC motor upon contact of the cut-line with the sensor, thereby to arrest a head of the endless tape at a starting position.

1 Claim, 4 Drawing Figures

HEAD-POSITIONING MECHANISM FOR AN ENDLESS TAPE

FIELD OF THE INVENTION

This invention relates to a head-positioning mechanism for an endless tape to be used mainly in various tape-recorders of an endless cartridge type.

In the description hereinafter, the term "head-positioning" is understood to signify that a predetermined initial position of the endless tape is searched and arrested during a recording, rewinding, erasing or playing-back operation.

BACKGROUND OF THE INVENTION

Conventional head-positioning mechanisms of this type have been formed, as shown in FIG. 4, in such a way that an endless tape 23 fed between a capstan 21, rotatable at a constant speed by a DC motor, and a pinch roller 22 urged thereagainst is run in a cloud loop through a pulley 24 and a tape guide 25. The endless tape 23 on its outer surface, between said pinch roller 22 and said tape guide 25, is contacted sequentially with a surface 29 of an erasing head 26, a record or play-back head 27 and a sensor 28. The endless tape 23 on its outer surface at a predetermined site has applied thereto an electrically conductive paint or is connected to an electrically conductive material for deenergizing a power source of a DC motor through short circuitry of an electronic circuit, thereby to arrest a head of the endless tape 23 at a starting position.

In this type of the head-positioning mechanism, however, the endless tape 23 is only used on its outer surface, resulting in disadvantages in that the endless tape 23 is fabricated with some difficulty. A a deenergizing means with a sensor 28 for a DC motor is complicated because of the use of the conductive endless tape 23, which leads to considerable cost and impracticality thus limiting its use in products of high grade and cost. Also, because the endless tape 23 is utilized only on its outer surface and the pulley 24 is necessarily used a longer endless tape 23 results which in turn means that a compact mechanism will not result.

SUMMARY OF THE INVENTION

Accordingly, an object of the invention is to provide a head-positioning mechanism for an endless tape for solving the above problems, in which fabrication of the endless tape and the deenergizing means of the DC motor may be simplified for considerably reducing its manufacturing cost and in which the endless tape may be wound in minimum length to achieve compactness to expand its range of application.

For this purpose, the invention provides a head-positioning mechanism for an endless tape, in which the endless tape fed between a capstan, rotatable at a constant speed by a DC motor and a pinch roller urged thereagainst is run in a closed loop through a feeding-/winding reel and a tape guide. The endless tape on its outer surface between said pinch roller and said tape guide is contacted sequentially with a surface of an erasing, recording or play-back head, characterized in that the endless tape on its inner side between the capstan and the tape guide is provided with an electrically conductive sensor. The endless tape at its predetermined site is provided with a cut-line and that the endless tape on its inner surface is normally supplied with a faint current for deenergizing a power source for the DC motor upon contact of said cut-line with said sensor, thereby to arrest a head of the endless tape at a starting position.

In accordance with the invention, the endless tape may be run with rotation of the DC motor during a normal recording/playing-back operation but may be arrested at its head upon contact of the cut-line of the endless tape with the sensor after one cycle. Further, even if the power source of the DC motor is deenergized on the way during the recording/playing-back operation, the rotation of the DC motor and hence the running of the endless tape may be continued by a current from an electrolytic condenser, so that the endless tape may be arrested at its head upon contact of the cut-line of the endless tape with the sensor after one cycle similarly to the normal operation.

The invention will now be illustrated in more detail with reference to the accompanying drawings for its preferred embodiments.

PREFERRED EMBODIMENTS OF THE INVENTION

Figure 1:
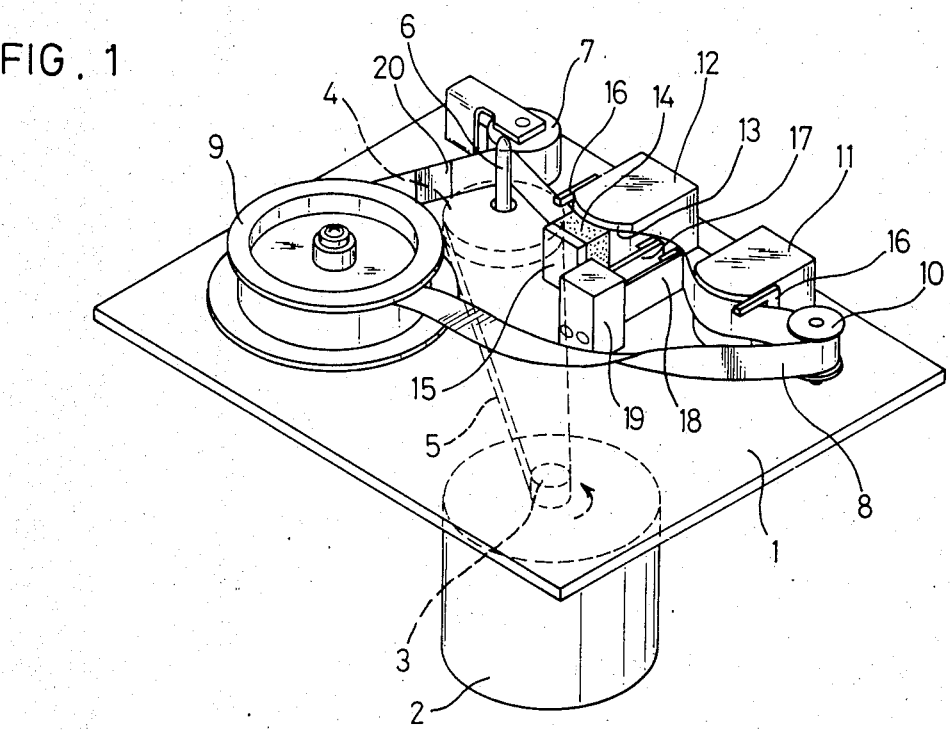
FIG. 1 is a perspective view of the mechanism according to the invention.
Figure 2:
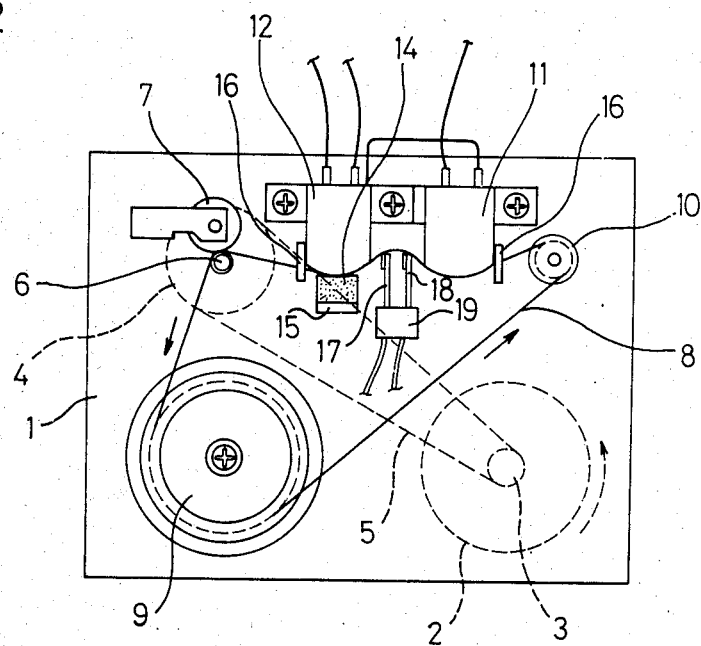
FIG. 2 is a plan view of the same.

As shown in FIGS. 1 and 2, an endless tape 8 is placed and fed between a capstan 6, which is rotatable at a constant speed by means of a belt 5 extended over a motor pulley 3 of a DC motor 2 and a fly-wheel 5 under a base 1, on one hand and a pinch roller 7 of rubber urged against the endless tape on the other hand. The endless tape 8 is run in a closed loop through a feeding/winding reel 9 and a tape guide 10, while the endless tape 8 on its outer surface between the pinch roller 7 and the tape guide 10 is contacted sequentially with a surface of an erasing, recording or play-back head 11, 12, 13 respectively. On the head surface 13 of the recording or play-back head 12 is arranged a tape presser 15 having a tape pad 14 for urging the endless tape 8 against the head, while guide pieces 16 for the endless tape 8 are arranged on the opposite sides of an erasing head 11 and the recording/playing-back head 12, respectively, as shown in FIG. 2.

In the head-positioning mechanism thus constructed, an electrically conductive sensor 19 consisting of an anode 17 and a cathode 18 spaced apart slightly from each other is arranged inside the endless tape 8 between the capstan 6 and the tape guide 10 with these electrodes 17 and 18 being contacted with an inner surface of the endless tape 8. The endless tape 8 at a predetermined site is provided with a cut-line 20 while on its inner surface is supplied normally with a faint current, so that a power source of the DC motor 2 may be deenergized upon contact of the cut-line 20 of the endless tape 8 with the sensor 19, thereby to arrest a head of the endless tape 8 at a starting (or an initial) position.

Figure 3:
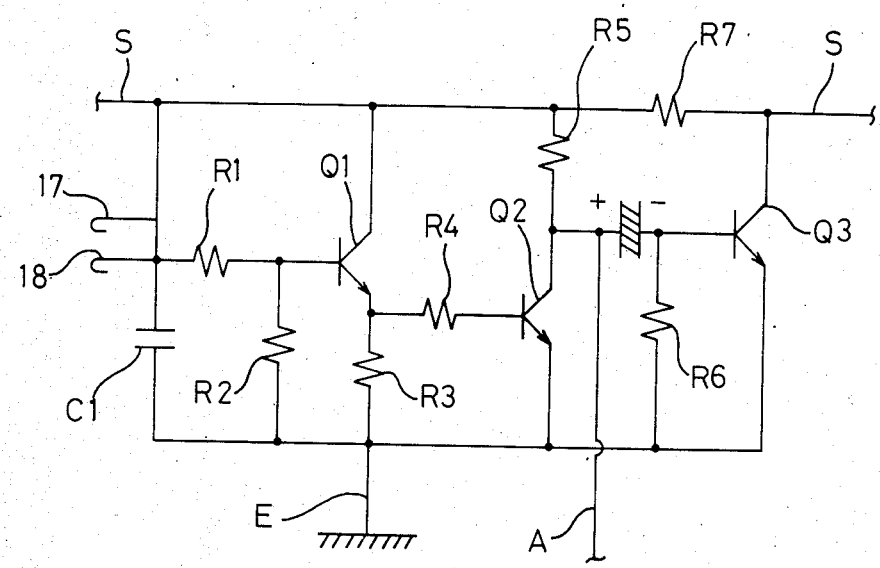
FIG. 3 is a schematic view of a sensor circuit for the head-positioning mechanism of the endless tape.
Figure 4:
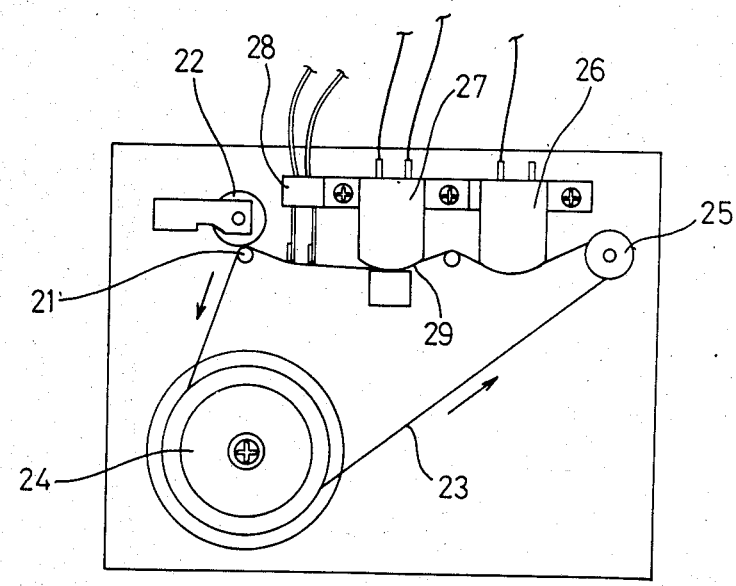
FIG. 4 is a plan view of a conventional head-positioning mechanism.

The anode 17 and the cathode 18 of the sensor 19 are connected with a sensor circuit for positioning the head of the endless tape 8. In the sensor circuit, as shown in FIG. 3, the anode 17 of the sensor 19 is connected to a terminal S on a switching circuit side (not shown), while the cathode 18 of the sensor 19 is connected to a grounding terminal E through a condenser C1. Further, the cathode plate 18 is connected to a base of a NPN transistor Q1 through a resistance R1, which transistor Q1 at its base is connected to the grounding terminal E through a resistance R2. The transistor Q1 has a collector which is connected to the terminal S on the switching circuit side, and an emitter which is connected to a base of a NPN transistor Q2 through a resistance R4. The collector of the transistor Q2 is connected to the terminal S through a resistance R5 and to a base of a NPN transistor Q3 through an electrolytic condenser C2 which at its input side in turn is connected to a terminal A on a recording/playing-back amplifying circuit (not shown), while the base of the transistor Q3 is connected to the grounding terminal E through a resistance R6. The transistor Q3 has a collector which is connected to the terminal S on the switching circuit side. Between the collector of the transistor Q3 and the resistance R5 is arranged a resistance R7, while the emitters of the transistors Q2 and Q3 are connected to the grounding terminal E.

The sensor thus constructed will be described for its operation herein-below. During the normal recording and play-back operation, the transistors Q1 and Q2 are in their ON state for allowing the DC motor 2 to rotate and thus the endless tape 8 to run. When the head of the endless tape 8 completes its one cycle to allow the cut-line 20 of the endless tape 8 to be contacted with the sensor 19, the transistor Q3 comes into its OFF state to deenergize the power source, thereby to arrest the head of the endless tape 8 at the starting position. Should the head of the endless tape 8 be on its way during a recording/play-back operation, and should the DC motor 2 be deenergized, the collector current of the transistor Q2 stored in the electrolytic condenser C2 during rotation of the DC motor 2, enables the transistor Q3 to maintain its ON state for continuing operation of the DC motor 2 and the endless tape 8, even if the transistors Q1 and Q2 come into their OFF state to discontinue current flow from the transistor Q2. Thus, similarly to the normal operation, after the head of the endless tape 8 has completed its one cycle, allowing the cut-line 20 of the endless tape 8 to be contacted with the sensor, the transistor Q3 comes into its OFF state to cut off the power, thereby to arrest the head of the endless tape 8 at the starting position.

In the above embodiment, the sensor 19 is arranged inside the endless tape 8 between the erasing head 11 and the recording or play-back head 12, but not limited thereto and may be arranged between the capstan 6 and the recording/playing-back head 12 so long as its location is inside the endless tape 8 between the capstan 6 and the tape guide 10. In this case, a tape guide is provided inside the endless tape 8 between the erasing head 11 and the recording/play-back head 12.

In accordance with the invention, the endless tape on its inner side between the capstan and the tape guide is provided with the electrically conductive sensor and at its predetermined site is provided with the cut-line, while the endless tape on its inner surface is normally supplied with the faint current for deenergizing the power source of the DC motor upon contact of the cut-line with the sensor thereby to arrest the head of the endless tape at the starting position, so that the head of the endless tape 8 may be exactly positioned at the starting line not only when the head of the endless tape 8 completes its one cycle of the recording or playing-back operation but also should the switch of the DC motor be denarcotize when the endless tape is on its way during a recording or play-back operation. Further, the possibility of thus using the inner surface of the endless tape 8 without need for an electrically conductive endless tape results in ease of fabrication. Also, use of a simple power-cutting means for the DC motor 2, employing sensor 19 results in considerable cost reduction. Consequently, the head-positioning mechanism according to the invention has wide range application from low grade devices to low price toys.

In addition, the possibility of using the inner surface of the endless tape 8 together with the closed loop endless tape 8 operation through the feeding/rewinding reel 9 and the tape guide 10 may eliminate the requirement for conventional pulleys so that the endless tape 8 may be wound on the reel 9 in minimal length, resulting in a compact structure.

Although the head-positioning mechanism according to the invention has been described herein-above with reference mainly to invention has been described hereinabove with reference mainly to its usage in various tape recorders of the endless cartridge type, it may also be utilized for a vocal synthesizer LSI, a receiver, a stereo, an interphone and others in the very wide range of applications.

What is claimed is:

1. A head-positioning mechanism for an endless tape, in which the endless tape fed between the capstan rotatable at a constant speed by a DC motor and a pinch roller urged against the tape is run in a closed loop through a feeding/winding reel and a tape guide, said endless tape having an inner and an outer surface, said tape on its outer surface between said pinch roller and said tape guide being contacted sequentially with a surface of an erasing, recording or playing-back head, characterized in that the endless tape on its inner side between the capstan and the tape guide is provided with an electrically conductive sensor, that the endless tape at a predetermined site thereof is provided with a cut-line and that the endless tape on its inner surface is normally supplied with a faint current for deenergizing a power source for said DC motor upon contact of said cut-line with said sensor, thereby to arrest a head of the endless tape at a starting position.

* * * * *